United States Patent
Ishihara et al.

(10) Patent No.: US 9,695,080 B2
(45) Date of Patent: Jul. 4, 2017

(54) GLASS PARTICLE DEPOSIT PRODUCING METHOD AND GLASS PREFORM PRODUCING METHOD

(71) Applicant: SUMITOMO ELECTRIC INDUSTRIES, LTD., Osaka-shi, Osaka (JP)

(72) Inventors: Tomohiro Ishihara, Yokohama (JP); Takashi Yamazaki, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 55 days.

(21) Appl. No.: 14/380,173

(22) PCT Filed: Dec. 27, 2013

(86) PCT No.: PCT/JP2013/085249
§ 371 (c)(1),
(2) Date: Aug. 21, 2014

(87) PCT Pub. No.: WO2014/104359
PCT Pub. Date: Jul. 3, 2014

(65) Prior Publication Data
US 2015/0033799 A1    Feb. 5, 2015

(30) Foreign Application Priority Data
Dec. 28, 2012    (JP) .................. 2012-288336

(51) Int. Cl.
*C03B 20/00*    (2006.01)
*C03B 37/014*    (2006.01)
(Continued)

(52) U.S. Cl.
CPC ........ *C03B 37/0142* (2013.01); *C03B 37/014* (2013.01); *F23D 14/22* (2013.01);
(Continued)

(58) Field of Classification Search
CPC ....... C03B 37/14; C03B 37/014; C03B 19/12; C03B 19/1423; C03B 20/00; C03B 2207/00
See application file for complete search history.

(56) References Cited

U.S. PATENT DOCUMENTS 5,599,371 A    2/1997    Cain et al.
6,588,230 B1 *  7/2003    Adler .................. C03B 19/1407
                                                        239/416
(Continued)

FOREIGN PATENT DOCUMENTS

DE    10102611 A1    8/2002
JP    H11-510778 A    9/1999
(Continued)

OTHER PUBLICATIONS

Machine Translation of DE 10102611. Originally published Aug. 1, 2002.*

(Continued)

*Primary Examiner* — Cynthia Szewczyk
(74) *Attorney, Agent, or Firm* — Drinker Biddle & Reath LLP

(57) ABSTRACT

A glass particle deposit producing method capable of preventing the variation in the outside diameter of a glass particle deposit and enhancing the yield of a glass raw material is provided. A glass particle deposit is produced by mounting a starting rod 11 and a glass particle generating burner 22 inside a reaction vessel 2, introducing a glass raw material into the burner 22, subjecting the glass raw material to a flame decomposition reaction inside a flame formed by the burner 22 to generate glass particles, and depositing the generated glass particles on the starting rod 11. At this time, the dispersion angle of the glass raw material jetted from the (Continued)

burner 22 with respect to the center axis of the burner 22 is set to the range of 5 to 70 degrees.

12 Claims, 4 Drawing Sheets

(51) Int. Cl.
  *F23D 14/22* (2006.01)
  *F23D 14/32* (2006.01)
  *F23D 23/00* (2006.01)

(52) U.S. Cl.
  CPC ............ *F23D 14/32* (2013.01); *F23D 23/00* (2013.01); *C03B 2207/04* (2013.01); *C03B 2207/06* (2013.01); *C03B 2207/12* (2013.01); *C03B 2207/14* (2013.01); *C03B 2207/20* (2013.01); *C03B 2207/32* (2013.01); *C03B 2207/34* (2013.01); *Y02P 40/57* (2015.11)

(56) References Cited

U.S. PATENT DOCUMENTS

| | | | |
|---|---|---|---|
| 2003/0091308 A1* | 5/2003 | Uchiyama | C03B 37/0142 385/124 |
| 2005/0132749 A1 | 6/2005 | Otsuka et al. | |
| 2006/0001952 A1 | 1/2006 | Janka et al. | |
| 2006/0185399 A1* | 8/2006 | Pyo | C03B 37/0142 65/531 |
| 2007/0256456 A1* | 11/2007 | Yoshida | C03B 37/0144 65/508 |
| 2011/0259056 A1* | 10/2011 | Yoshida | C03B 37/0142 65/416 |

FOREIGN PATENT DOCUMENTS

| | | |
|---|---|---|
| JP | 2005-187319 A | 7/2005 |
| JP | 2006-117476 A | 5/2006 |
| JP | 2007-076957 A | 3/2007 |
| JP | 2008-504207 A | 2/2008 |
| WO | WO-2012-136678 A1 | 10/2012 |

OTHER PUBLICATIONS

Notification of Reasons for Refusal issued Feb. 2, 2016 in Japanese Patent Application No. 2014-514943 (3 pages) with an English Translation (3 pages).

* cited by examiner

GLASS PARTICLE DEPOSIT PRODUCING METHOD AND GLASS PREFORM PRODUCING METHOD

TECHNICAL FIELD

The present invention relates to a glass particle deposit producing method for producing a glass particle deposit by depositing glass particles on a starting rod using the OVD (Outside Vapor-phase Deposition) method, the VAD (Vapor Phase Axial Deposition) method, the MMD (Multi-burner Multi-layer Deposition) method, etc. and to a glass preform producing method for producing a glass preform by heating and transparentizing the glass particle deposit.

BACKGROUND ART

Conventionally, a producing method including a deposition process for producing a glass particle deposit using the OVD method, the VAD method, etc. and a transparentizing process for producing a transparent glass preform by heating this glass particle deposit is known as a glass preform producing method.

For example, Patent Document 1 discloses a precision burner, used at the time of forming a preform (glass preform), for oxidizing silicon-containing compounds not containing halides, such as octamethylcyclotetrasiloxane (OMCTS).

PRIOR ART DOCUMENT

Patent Document

Patent Document 1
JP-H11-510778-A

SUMMARY OF THE INVENTION

Problem that the Invention is to Solve

However, in the precision burner described in Patent Document 1, when a glass particle deposit is produced by depositing glass particles generated inside flames of the precision burner on a starting rod, there is room for improvement in the prevention of the variation in the outside diameter of the glass particle deposit and in the enhancement of the yield of a glass raw material.

In consideration of these problems, the present invention is intended to provide a glass particle deposit producing method and a glass preform producing method capable of preventing the variation in the outside diameter of a glass particle deposit and enhancing the yield of a glass raw material without causing a problem of burner clogging or the like.

Means for Solving the Problem

To solve the above-mentioned problems, a glass particle deposit producing method according to the present invention is a glass particle deposit producing method including a deposition process for producing a glass particle deposit by mounting a starting rod and a glass particle generating burner inside a reaction vessel, introducing a glass raw material into the burner, subjecting the glass raw material to a reaction inside a flame formed by the burner to generate glass particles, and depositing the generated glass particles on the starting rod, wherein a dispersion angle of the glass raw material jetted from the burner with respect to a center axis of the burner is set to a range of 5 to 70 degrees.

The glass particle deposit producing method according to the present invention may be configured so that the dispersion angle is set to a range of 10 to 50 degrees in the deposition process.

The glass particle deposit producing method according to the present invention may be configured so that the dispersion angle is set to a range of 20 to 40 degrees in the deposition process.

The glass particle deposit producing method according to the present invention may be configured so that the shortest distance from the tip end opening section of the raw material port of the burner for jetting the glass raw material to the tip end opening section of the combustion gas port of the burner for jetting oxygen is set to a range of 10 to 100 mm in the deposition process.

The glass particle deposit producing method according to the present invention may be configured so that the shortest distance from the tip end opening section of the raw material port of the burner for jetting the glass raw material to the tip end opening section of the combustion gas port of the burner for jetting oxygen is set to a range of 20 to 100 mm in the deposition process.

Besides, the glass particle deposit producing method according to the present invention may be configured so that the shortest distance from the tip end opening section of the raw material port of the burner for jetting the glass raw material to the tip end opening section of the combustion gas port of the burner for jetting oxygen is set to a range of 30 to 100 mm in the deposition process.

Additionally, the glass particle deposit producing method according to the present invention may be configured so that the glass raw material to be supplied to the burner is siloxane in the deposition process.

The glass particle deposit producing method according to the present invention may be configured so that the glass raw material to be supplied to the burner is octamethylcyclotetrasiloxane (OMCTS) in the deposition process.

The glass particle deposit producing method according to the present invention may be configured so that the glass raw material to be jetted from the burner is set to a liquid spray state in the deposition process.

The glass particle deposit producing method according to the present invention may be configured so that the glass raw material to be jetted from the burner is set to a gas state in the deposition process.

A glass preform producing method according to the present invention includes a transparentization process for producing a glass particle deposit using the above-mentioned glass particle deposit producing method and for producing a transparent glass preform by heating the produced glass particle deposit.

The glass preform producing method according to the present invention may be configured so that the deposition of the glass particle deposit in the deposition process is carried out by the OVD method, the VAD method or the MMD method.

Advantage of the Invention

With the glass particle deposit producing method and the glass preform producing method according to the present invention, the variation in the outside diameter of the glass particle deposit can be prevented and the yield of the glass raw material can be enhanced without causing a problem of burner clogging or the like by making, for example, the dispersion angle of the glass raw material to be jetted from the glass particle generating burner appropriate.

MODE FOR CARRYING OUT THE INVENTION

An embodiment of a glass particle deposit producing method and a glass preform producing method according to the present invention will be described below on the basis of the accompanying drawings. Although the OVD (Outside Vapor-phase Deposition) method is described as an example of the producing method described below, the present invention is not limited to the OVD method. The present invention can also be applied to a method similar to the OVD method, that is, a method for depositing glass from a glass raw material, for example, the VAD (Vapor Phase Axial Deposition) method and the MMD method.

Figure 1:
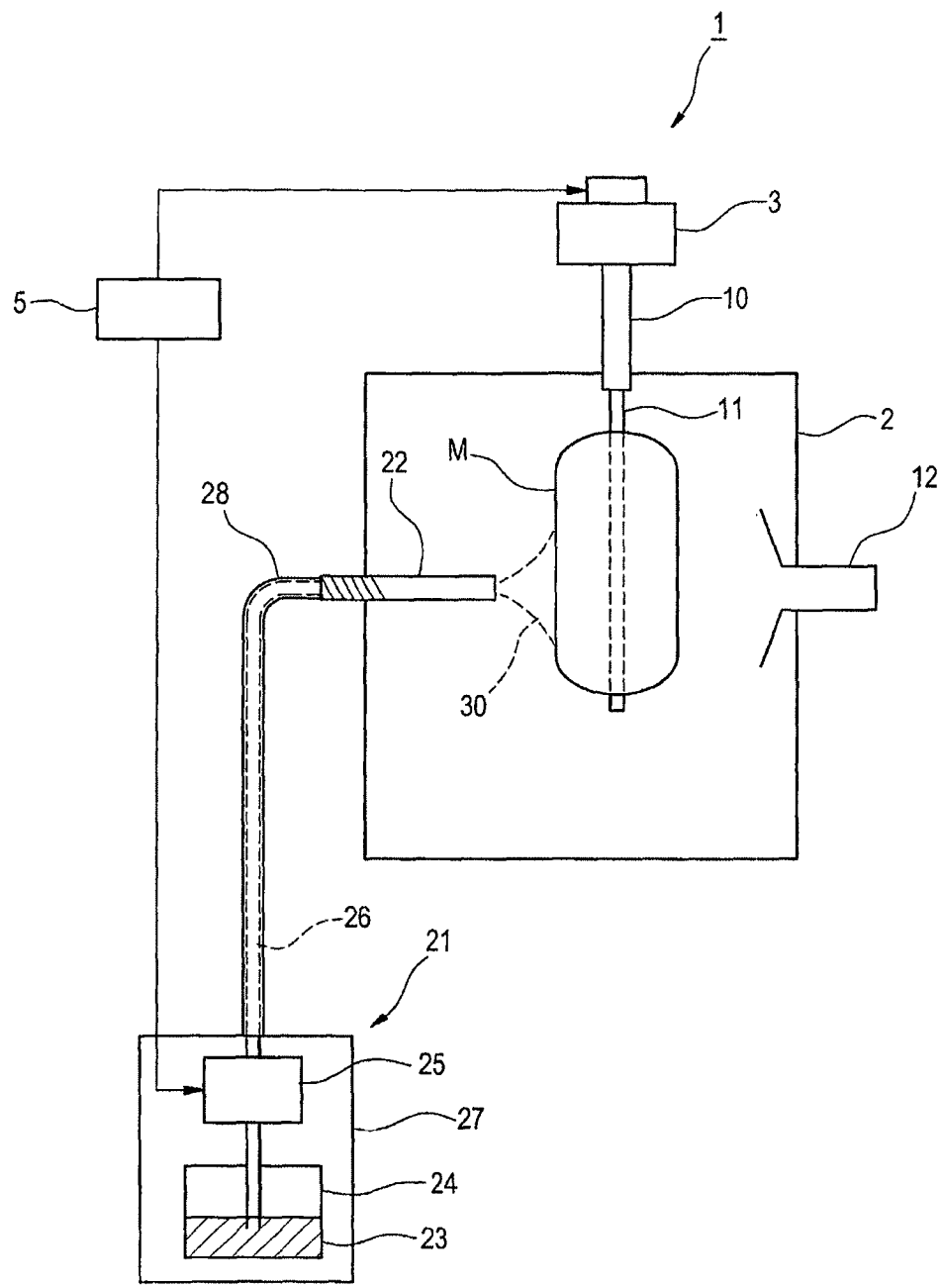
FIG. 1 is a view showing the configuration of an embodiment of a production apparatus for carrying out a glass particle deposit producing method according to the present invention.

FIG. 1 is a view showing the configuration of a production apparatus 1 for carrying out a glass particle deposit producing method according to this embodiment. The production apparatus 1 is equipped with a reaction vessel 2, a lifting-rotating device 3, a raw material supply device 21, a glass particle generating burner 22 and a control section 5 for controlling the operations of the respective sections.

The reaction vessel 2, serving as a vessel in which a glass particle deposit M is formed, is equipped with an exhaust pipe 12 installed on a side of the vessel.

The lifting-rotating device 3 is a device for elevating/lowering and rotating the glass particle deposit M via a support rod 10 and a starting rod 11. The lifting-rotating device 3 controls the operation of the support rod 10 on the basis of control signals transmitted from the control section 5. The lifting-rotating device 3 elevates/lowers the glass particle deposit M while rotating it.

The support rod 10 is disposed so as to be inserted through a through-hole formed in the upper wall of the reaction vessel 2, and the starting rod 11 is mounted at one end section (the lower end section in FIG. 1) thereof disposed inside the reaction vessel 2. The other end section (the upper end section in FIG. 1) of the support rod 10 is held by the lifting-rotating device 3.

The starting rod 11, serving as a rod on which glass particles are deposited, is mounted on the support rod 10.

The exhaust pipe 12 is a pipe for discharging glass particles having not adhered to the starting rod 11 and the glass particle deposit M to the outside of the reaction vessel 2.

The raw material supply device 21 supplies a liquid raw material 23 to the burner 22. In FIG. 1, a gas supply apparatus for supplying flame-forming gases is not shown.

The raw material supply device 21 is formed of a raw material vessel 24 for storing the liquid raw material 23, a pump 25 for supplying the liquid raw material 23, a supply pipe 26 for guiding the liquid raw material 23 into the burner 22, and a booth 27 including the raw material vessel 24, the pump 25 and part of the supply pipe 26.

The pump 25 is a device for supplying the liquid raw material 23, which is sprayed from the burner 22, to the burner 22 via the supply pipe 26. The pump 25 controls the supply quantity of the liquid raw material 23 to be supplied to the burner 22 on the basis of control signals transmitted from the control section 5.

The supply pipe 26 is a pipe for guiding the liquid raw material 23 into the burner 22. A tape heater 28 serving as a heating element may be wound around the outer periphery of the supply pipe 26 and around part of the outer periphery of the burner 22 to maintain the temperature of the supply pipe 26 at a high temperature. When this tape heater 28 is energized, the supply pipe 26 and the burner 22 are heated, and the temperature of the liquid raw material 23 to be sprayed from the burner 22 can be raised to a temperature to the extent that the liquid raw material 23 is not evaporated, for example, to a temperature of 30 to 170° C. in the case that OMCTS is used for example.

In the burner 22, the liquid raw material 23 in a sprayed state is evaporated in a flame, the evaporated material is subjected to oxidation to generate glass particles 30, and the generated glass particles 30 are sprayed to the starting rod 11 and deposited.

To the burner 22, a siloxane solution, represented by, for example, OMCTS, is supplied as the liquid raw material 23; $H_2$, $O_2$, etc. are supplied as flame-forming gases; and an inert gas, such as $N_2$ or Ar, is supplied as a burner seal gas. Inside the flame of the burner 22, the glass particles 30 are generated by oxidation, and the generated glass particles 30 are deposited on the starting rod 11, whereby the glass particle deposit M having a predetermined outside diameter is produced.

The control section 5 controls the operations of the lifting-rotating device 3, the raw material supply device 21, etc. The control section 5 transmits, to the lifting-rotating device 3, control signals for controlling the elevating/lowering speed and the rotation speed of the glass particle deposit M. The control section 5 transmits, to the pump 25 of the raw material supply device 21, control signals for controlling the flow rate of the liquid raw material 23 to be sprayed from the burner 22.

For example, a multi-nozzle structure or a multi-layer pipe structure, such as a nine-layer pipe structure, is used as the burner 22 to jet the glass raw material and the flame-forming gases.

Figure 2:
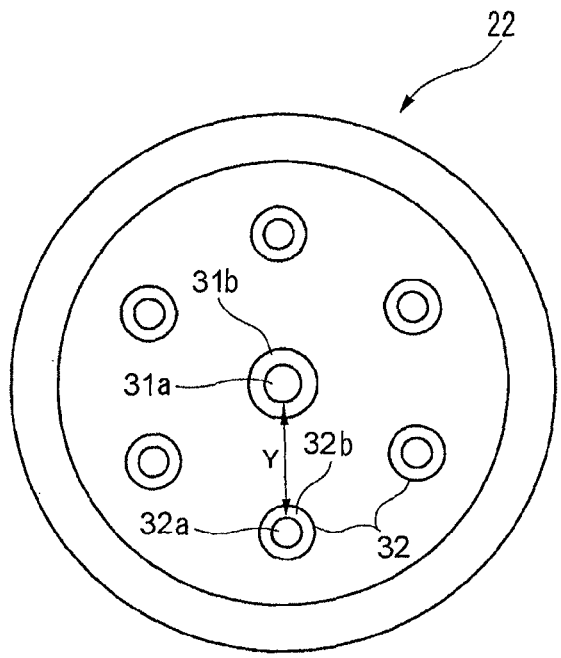
FIG. 2 is a front view showing an embodiment of a burner for generating glass particles.

FIG. 2 is a view showing an embodiment of the burner 22 having a multi-nozzle structure.

The burner 22 shown in FIG. 2 has, at its center, a raw material port 31a for jetting the liquid raw material 23 serving as the glass raw material or for jetting a raw material gas, and a seal gas consisting of an inert gas is jetted from a port 31b formed around the outer periphery of the raw material port 31a. The burner 22 is provided, around the periphery thereof, with plural combustion gas ports 32 for jetting a combustion gas. For example, the liquid raw material 23, such as OMCTS, or the raw material gas is jetted from the raw material port 31a disposed at the center.

The combustion gas port 32 has a dual structure, wherein oxygen ($O_2$) serving as a combustion supporting gas is jetted from a center port 32a, and hydrogen ($H_2$) or the like serving as a combustible gas is jetted from an outer peripheral port 32b.

In the burner 22, the glass raw material is jetted into the oxyhydrogen flame generated by the combustible gas, and the glass raw material is formed into silicon oxide ($SiO_2$) particles by the oxyhydrogen flame.

Figure 3:
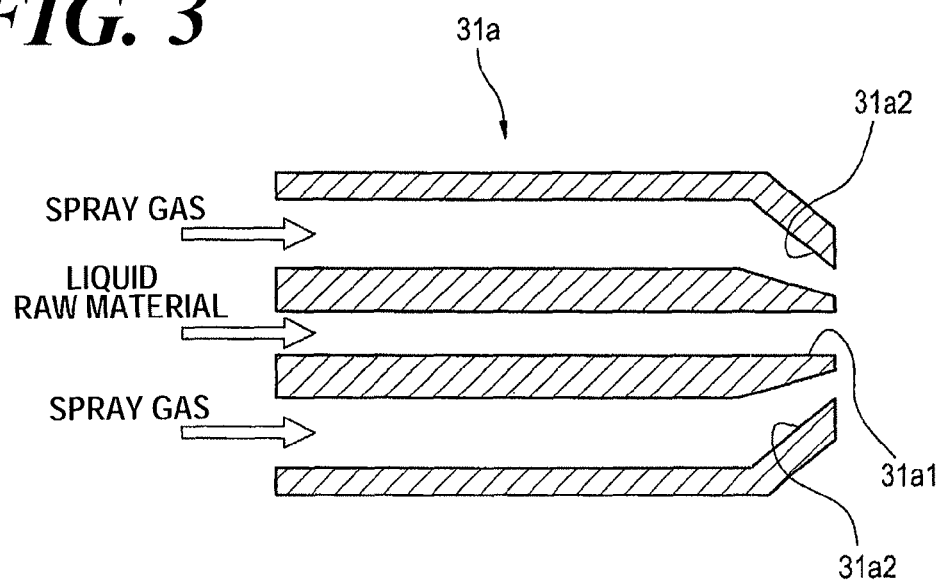
FIG. 3 is a cross-sectional view showing the raw material port of the burner shown in FIG. 2.

In the case that the liquid raw material 23 is supplied to the raw material port 31a of the burner 22 having the multi-nozzle structure, the raw material port 31a has such a structure as shown in FIG. 3. In FIG. 3, the raw material port 31a has a liquid raw material port 31a1 at the center and has a spray gas port 31a2 around the outer periphery of the liquid raw material port 31a1. The liquid raw material 23, such as an OMCTS solution, is supplied in a liquid state from the liquid raw material port 31a1, and a gas, such as $N_2$, $O_2$ or Ar, is supplied from the spray gas port 31a2.

Figure 4:
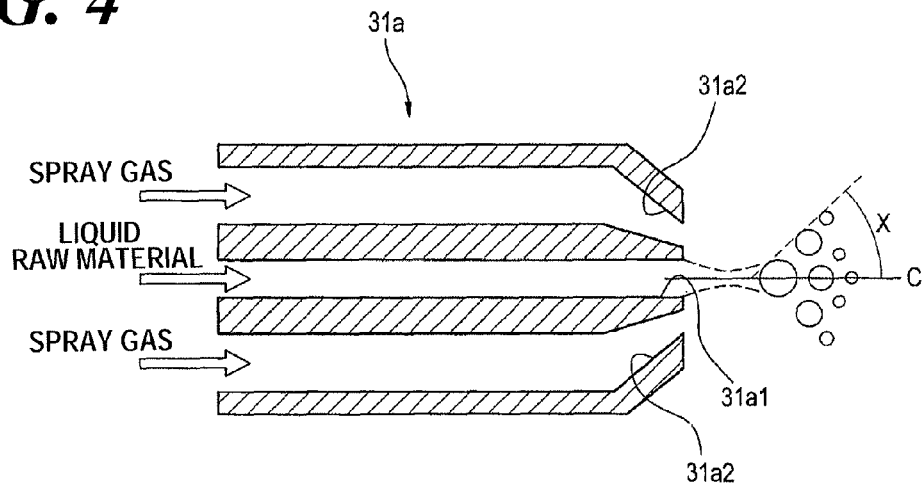
FIG. 4 is a cross-sectional view showing a state in which a liquid raw material and a spray gas have been supplied to the raw material port shown in FIG. 3.

The tip end portion of the spray gas port 31a2 has a shape inclined toward the liquid raw material port 31a1. Hence, the jetting direction of the spray gas is inclined toward a predetermined position on the center axis of the burner 22 away from the tip end of the burner 22 by a predetermined dimension, whereby the spray gas collides with the liquid raw material 23 jetted from the liquid raw material port 31a1. The liquid raw material 23 jetted from the liquid raw material port 31a1 is atomized by the collision with the spray gas, thereby being dispersed almost uniformly inside the flame in the radial direction of the burner 22. The dispersion angle X (see FIG. 4) of the liquid raw material 23 jetted from the burner 22 with respect to the center axis (the center axis C of the liquid raw material port 31a1) of the burner 22 can be adjusted to a desired angle by adjusting the flow velocity of the gas jetted from the spray gas port 31a2 inclined toward the center axis of the liquid raw material port 31a1 provided at the center as described above, adjusting the flow rate of the liquid raw material 23 jetted from the liquid raw material port 31a1, or adjusting the tip end structure of the liquid raw material port 31a1 appropriately.

Figure 5:
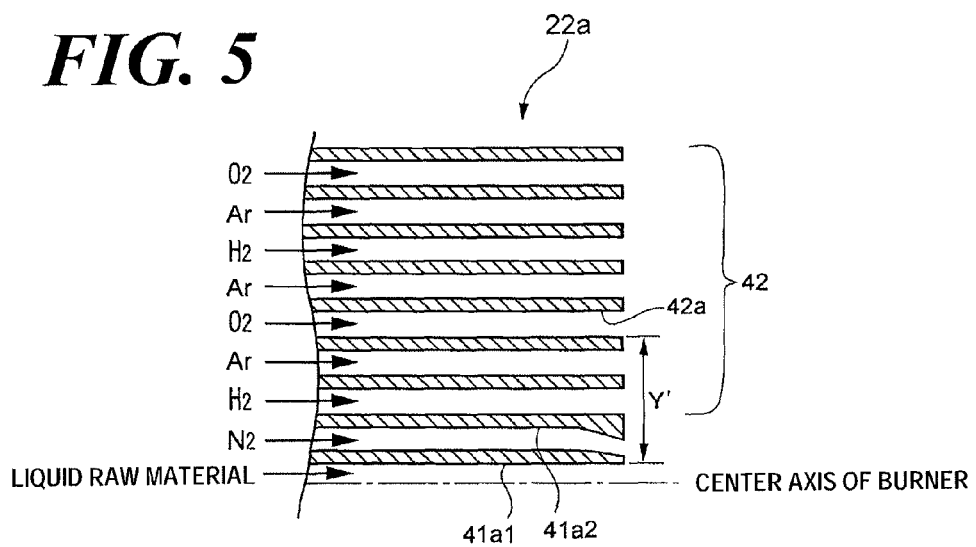
FIG. 5 is a cross-sectional view showing another embodiment of the burner for generating glass particles.

FIG. 5 is a view showing an embodiment of a burner having a multi-layer pipe burner structure.

The burner 22a shown in FIG. 5 is a burner having a nine-layer pipe structure. FIG. 5 is a vertical (axial) cross-sectional view showing part of the tip end side of the burner and showing only one side thereof with respect to the center axis of the burner because the burner is axially symmetric.

The center section of the burner is provided with a liquid raw material port 41a1 and a spray gas port 41a2. Around the outer periphery of the spray gas port 41a2, gas ports 42 are provided in plural layers (herein, seven layers), through which $H_2$ and $O_2$ serving as flame-forming gases and Ar serving as a burner seal gas are supplied. The tip end portion of the spray gas port 41a2 has a shape inclined toward the liquid raw material port 41a1. Hence, the jetting direction of the spray gas is inclined toward a predetermined position on the center axis of the burner 22a away from the tip end of the burner 22a by a predetermined dimension, whereby the spray gas collides with the liquid raw material 23 jetted from the liquid raw material port 41a1, and the liquid raw material 23 is atomized by the collision with the spray gas, thereby being dispersed almost uniformly in the radial direction of the burner 22a.

In this embodiment, as the liquid raw material 23, siloxane serving as a halogen-free raw material is used, preferably, an OMCTS solution is used. $SiCl_4$ used as a glass raw material conventionally is formed into $SiO_2$ glass particles on the basis of the following formula (1).

$$SiCl_4 + 2H_2O \rightarrow SiO_2 + 4HCl \qquad \text{Formula (1)}$$

In this case, since HCl (hydrochloric acid) is generated as a byproduct adversely affecting ambient environment, an apparatus for making hydrochloric acid harmless is required, whereby the running cost for producing the glass raw material becomes very high.

On the other hand, in the case that siloxane, such as an OMCTS solution or an OMCTS gas, is used as in this embodiment, $SiO_2$ glass particles are generated on the basis of the following formula (2).

$$[SiO(CH_3)_2]_4 + 16O_2 \rightarrow 4SiO_2 + 8CO_2 + 12H_2O \qquad \text{Formula (2)}$$

In this case, since such a harmful substance as hydrochloric acid is not discharged, the production cost of the glass raw material can be suppressed.

Next, the procedures of the glass particle deposit producing method and the glass preform producing method will be described.

[Deposition Process]

Glass particles are deposited by the OVD (Outside Vapor-phase Deposition) method to produce the glass particle deposit M. First, as shown in FIG. 1, in a state in which the support rod 10 is mounted on the lifting-rotating device 3 and the starting rod 11 is mounted on the lower end section of the support rod 10, the starting rod 11 and part of the support rod 10 are accommodated inside the reaction vessel 2.

Next, the pump 25 supplies the liquid raw material 23 to the burner 22 (22a in FIG. 5) while controlling the supply quantity of the material on the basis of control signals transmitted from the control section 5.

The liquid raw material 23 and the oxyhydrogen gases (flame-forming gases) are supplied to the burner 22, 22a, and the liquid raw material 23 in a liquid spray state is evaporated in the oxyhydrogen flame and then subjected to oxidation to generate glass particles.

Then, the burner 22, 22a continuously deposits the glass particles generated inside the flame on the starting rod 11 that is rotated and elevated/lowered.

At this time, the dispersion angle of the liquid raw material 23 jetted from the burner 22, 22a with respect to the center axis of the burner 22, 22a is set to a predetermined range. In the case that the dispersion angle of the liquid raw material 23 is small, the atomized liquid raw material 23 concentrates in the central portion of the flame, and the heating density on the surface on which the glass particles are deposited increases excessively. As a result, the density of the glass particle deposit M becomes high and the outside diameter thereof becomes small, whereby the deposition efficiency of the glass particles decreases significantly. In the case that the dispersion angle of the liquid raw material 23 is large, the atomized liquid raw material is dispersed excessively, whereby the probability of the collision of the glass particles generated inside the flame with the starting rod 11 and the glass particle deposit M serving as targets is reduced and the yield of the glass raw material lowers. The glass particles are liable to adhere to the area around the tip end opening section of the liquid raw material port 31a1, 41a1, and there occurs a problem that the liquid raw material port 31a1, 41a1 is clogged. For this reason, it is required to make the dispersion angle appropriate. More specifically, the flow rate of the sprayed gas to be supplied from the spray gas port 31a2, 41a2 is changed so that the dispersion angle X of the liquid raw material 23 jetted from the burner 22, 22a with respect to the center axis of the burner 22, 22a is set to the range of 5 to 70 degrees, preferably, 10 to 50 degrees, further preferably, 20 to 40 degrees. As an example of specific means for adjusting the dispersion angle X, adjustment is made so that the flow rate of the spray gas is set, for example, to the range of appropriately 0.2 to 1.0 L/min. In the case that the dispersion angle X is set to the above-mentioned range, the yield of the glass raw material is enhanced and the liquid raw material 23 is dispersed uniformly inside the flame in the radial direction of the burner 22, 22a, whereby the glass particles generated inside the flame are deposited uniformly on the starting rod 11. This is effective in suppressing the variation in the outside diameter of a transparent glass preform in the longitudinal direction thereof, the transparent glass preform being generated by sintering the glass particle deposit M.

Besides, inside the flame of the burner 22, glass particles are generated by the oxidation of the OMCTS solution or the like serving as the liquid raw material 23. Hence, in the case that the distance between the liquid raw material port 31a1, 41a1 for jetting the OMCTS solution and the oxygen gas port 32a, 42a, located at the center of the combustion gas port 32, 42, for jetting oxygen is set to a predetermined range, the width of the flow of the glass particles generated inside the flame can be made appropriate. More specifically, the shortest distance Y, Y' (see FIGS. 2 and 5) from the tip end opening section of the liquid raw material port 31a1, 41a1 of the burner 22, 22a to the tip end opening section of the oxygen gas port 32a, 42a for jetting oxygen is set to the range of 10 to 100 mm, preferably, 20 to 100 mm, further preferably, 30 to 100 mm. With this range setting, the liquid raw material 23 is dispersed inside the flame in the radial direction before reacting with oxygen, and oxidation (exothermic reaction) occurs in a state in which the raw material has been dispersed appropriately, whereby the temperature distribution inside the flame can be made smooth. As a result, the variation in the outside diameter in the longitudinal direction at the time when the glass particle deposit M is formed into the transparent glass preform can be suppressed further. By the setting of the shortest distance Y, Y' to the above-mentioned range, the density of the glass particle deposit M is made appropriate, and the yield of the glass raw material is enhanced. In the case that the shortest distance Y, Y' is less than 10 mm, the glass particles adhere to the area around the tip end opening section of the liquid raw material port 31a1, 41a1, and there occurs a problem that the liquid raw material port 31a1, 41a1 is liable to be clogged. By the setting of the shortest distance Y, Y' to the above-mentioned range, the clogging in the liquid raw material port 31a1, 41a1 is suppressed.

The lifting-rotating device 3 axially elevates/lowers and rotates the starting rod 11 and the glass particle deposit M deposited on the starting rod 11 on the basis of control signals transmitted from the control section 5.

[Transparentization Process]

Next, the obtained glass particle deposit M is heated at 1100° C. in a mixed atmosphere of an inert gas and a chlorine gas and then heated at 1550° C. in an atmosphere of He to obtain a transparent glass preform. This kind of glass preform production is performed repeatedly.

Since siloxane is flammable, the temperature of the flame rises as the supply quantity thereof increases. However, in this embodiment, siloxane is dispersed uniformly in the radial direction of the burner 22, 22a inside the flame of the burner 22, 22a and the siloxane having been dispersed inside the flame is subjected to oxidation (exothermic reaction). Hence, there is an effect of making the heating density on the surface on which the glass particles are deposited lower than that in the conventional method and making the temperature of the deposition surface appropriate. As a result, the density and the outside diameter of the glass particle deposit M are made appropriate and the yield of the glass raw material can be enhanced.

Since the standard boiling point of OMCTS is very high, 175° C., an expensive processing device is required to be provided separately to evaporate OMCTS and supply it in a gas state to the burner 22, 22a. Hence, in this embodiment, it is preferable to use a spraying system in which OMCTS in a liquid state is supplied to the burner 22, 22a and the spray gas is sprayed from around the periphery of the OMCTS solution jetted from the burner 22, 22a to atomize the OMCTS solution; however, it may also be possible that the OMCTS solution is heated and evaporated into a gas state and jetted from the burlier 22, 22a. In the case of the spraying system, it is preferable to increase evaporation efficiency by providing a port for jetting a flammable gas between the raw material port 31a, 41a and the oxygen gas port 32a, 42a.

EXAMPLES

Glass particles are deposited by the OVD method using the production apparatus shown in FIG. 1; in other words, the glass particle deposit M is produced [deposition process]. The obtained glass particle deposit M is heated at 1100° C. in a mixed atmosphere of an inert gas and a chlorine gas and then heated at 1550° C. in an atmosphere of He to perform glass transparentization [transparentization process].

A high-purity quartz glass rod measuring 17 mm in diameter and 400 mm in length is used as a starting rod; and an OMCTS solution (flow rate: 4 ml/min) serving as a liquid raw material, $N_2$ (flow rate: 0.6 SLM) serving as a spray gas, $H_2$ (flow rate: 20 to 50 SLM) and $O_2$ (flow rate: 30 to 70 SLM) serving as flame-forming gases, and Ar (flow rate: 1 to 5 SLM) serving as a burner seal gas are supplied to the burner.

In the deposition process, the dispersion angle X (°) of the OMCTS solution sprayed from the burner with respect to the center axis of the burner and the shortest distance Y (mm) from the tip end opening section of the raw material port (liquid raw material port) of the burner to the tip end opening section of the oxygen gas port of the burner are selected appropriately. While the dispersion angle X (°) and the shortest distance Y are changed, glass particles are deposited, and the yield A (%) of the raw material of the produced glass particle deposit, the variation B (mm) in the outside diameter of the transparent glass preform in the longitudinal direction thereof and the probability C (%) of the occurrence of burner clogging due to the deposition of the glass particles at the tip end of the burner are evaluated. The yield A of the raw material is the ratio of the mass of the glass particles 30 actually deposited on the starting rod 11 and the glass particle deposit M to the mass of $SiO_2$ in the case that the OMCTS solution supplied to the burner is chemically reacted with 100% quartz glass particles. The result is shown in Table 1.

TABLE 1

|  | X (°) | Y (mm) | A (%) | B (mm) | C % |
|---|---|---|---|---|---|
| Example 1 | 5 | 30 | 40.0 | 5 | 0 |
| Example 2 | 10 | 30 | 49.0 | 3 | 0 |

TABLE 1-continued

| | X (°) | Y (mm) | A (%) | B (mm) | C % |
|---|---|---|---|---|---|
| Example 3 | 20 | 30 | 49.5 | 2 | 0 |
| Example 4 | 30 | 30 | 48.0 | 2 | 0 |
| Example 5 | 40 | 30 | 46.0 | 2 | 0 |
| Example 6 | 50 | 30 | 45.0 | 2 | 0 |
| Example 7 | 70 | 30 | 44.0 | 2 | 0 |
| Example 8 | 20 | 20 | 45.0 | 3 | 0 |
| Example 9 | 20 | 10 | 42.0 | 4 | 0 |
| Example 10 | 20 | 50 | 47.0 | 2 | 0 |
| Example 11 | 20 | 5 | 40.0 | 6 | 1 |
| Example 12 | 20 | 100 | 43.0 | 3 | 0 |
| Example 13 | 20 | 110 | 41.0 | 4 | 0 |
| Comparison example 1 | 3 | 30 | 32.0 | 10 | 0 |
| Comparison example 2 | 80 | 4 | 35.0 | 8 | 5 |

Examples 1 to 7

In Examples 1 to 7, the shortest distance Y is fixed to 30 mm, and the dispersion angle X is selected appropriately in the range of 5 to 70°.

As a result, in all these examples, the following results have been obtained: the yield A of the raw material is 40% or more, the variation B in the outside diameter of the glass preform in the longitudinal direction is 5 mm or less, and the probability C of the occurrence of burner clogging is 0%.

Examples 8 to 13

In Examples 8 to 13, the dispersion angle X is fixed to 20°, and the shortest distance Y is selected appropriately in the range of 5 to 110 mm.

As a result, in all these examples, the following results have been obtained: the yield A of the raw material is 40% or more, the variation B in the outside diameter of the glass preform in the longitudinal direction is 6 mm or less, and the probability C (%) of the occurrence of burner clogging is 1% or less. It is found that the yield A of the raw material increases in the case that the shortest distance Y is in the range of 30 to 50 mm.

Comparison Example 1

In Comparison example 1, the dispersion angle X is set to 3° and the shortest distance Y is set to 30 mm.

As a result, the following results have been obtained: the yield A of the raw material is 32%, the variation B in the outside diameter of the glass preform in the longitudinal direction is 10 mm, and the probability C of the occurrence of burner clogging is 0%.

Comparison Example 2

In Comparison example 2, the dispersion angle X is set to 80° and the shortest distance Y is set to 4 mm.

As a result, the following results have been obtained: the yield A of the raw material is 35%, the variation B in the outside diameter of the glass preform in the longitudinal direction is 8 mm, and the probability C of the occurrence of burner clogging is 5%.

[Measurement Evaluation]

In Examples 1 to 7 in which the dispersion angle X is set to the range of 5 to 70°, excellent results have been obtained: the yield A of the raw material is 40% or more, the variation B in the outside diameter of the glass preform in the longitudinal direction is 5 mm or less, and the probability C of the occurrence of burner clogging is 0%. In particular, when the dispersion angle X is in the range of 10 to 50°, the yield A of the raw material is 45% or more, and the variation in the outside diameter of the glass preform in the longitudinal direction is 3 mm or less. When the dispersion angle X is in the range of 20 to 40°, the yield A of the raw material is 46% or more.

Also in Examples 3 and 8 to 13 in which the shortest distance Y is set to the range of 5 to 110 mm, excellent results have been obtained: the yield A of the raw material is 40% or more, the variation B in the outside diameter of the glass preform in the longitudinal direction is 6 mm or less, and the probability C of the occurrence of burner clogging is 1% or less. According to the results of Examples 3 and 8 to 13, it is found that, in the case that the shortest distance Y is set to the range of 30 to 50 mm, the yield A of the raw material tends to be enhanced. Hence, the shortest distance Y is set preferably to the range of 20 to 100 mm, further preferably to the range of 30 to 100 mm. In Example 10, since the shortest distance Y is short, 5 mm, the probability of the occurrence of burner clogging is slightly degraded in comparison with those in the other examples.

On the other hand, in Comparison examples 1 and 2, since the dispersion angle X is set to the range of 5 to 70°, the yield A of the raw material is low, 35% or less, and the variation B in the outside diameter of the glass preform in the longitudinal direction is large, 8 mm or more. In Comparison example 2, the probability of the occurrence of burner clogging is degraded to 5%.

The glass particle deposit producing method and the glass preform producing method according to the present invention are not limited to the above-mentioned embodiment, but can be modified or improved appropriately as desired.

Figure 6:
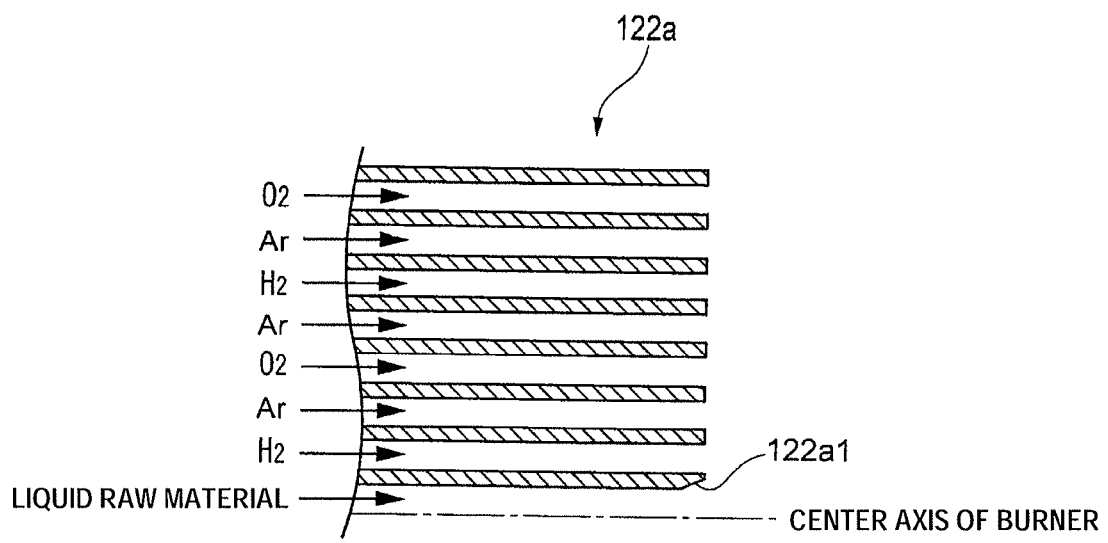
FIG. 6 is a cross-sectional view showing still another embodiment of the burner for generating glass particles.

Although the above-mentioned embodiment is configured so that the liquid raw material 23 is supplied to the burner 22, 22a by the pump 25 and atomized to generate glass particles, the present invention is not limited to this example. For example, a configuration may be used in which the OMCTS solution serving as the liquid raw material 23 is evaporated completely inside the raw material vessel 24 to obtain an OMCTS gas, whereby the OMCTS is jetted in a gas state from the burner 22. More specifically, the OMCTS solution is heated to its boiling point (for example, 175° C., that is, the standard boiling point of the OMCTS solution) or more inside the raw material vessel 24 and evaporated completely inside the raw material vessel 24, and the OMCTS gas is supplied to the burner 22 through the supply pipe 26 that is heated to a desired temperature using the tape heater 28. At this time, the pump 25 is not necessary, and a burner 122a having such an eight-layer pipe structure as shown in FIG. 6 is used as the burner 22. The burner 122a has a shape such that the tip end opening section 122a1 of the raw material port thereof is open toward the outlet side, and the dispersion angle of the OMCTS gas inside the flame is made appropriate by the opening angle thereof. With this kind of evaporation system, since the OMCTS solution is not required to be evaporated inside the flame, the OMCTS gas can be chemically changed efficiently to glass particles inside the flame, and the yield of the glass raw material can be enhanced further.

In the above-mentioned embodiment, although OMCTS has been taken as an example of siloxane and described, any kind can be used, provided that it belongs to the category of siloxane, and effects similar to those obtained in the above-mentioned embodiment are obtained.

Even if a raw material other than siloxane, such as $SiCl_4$, is used, the effect of stabilizing the outside diameter of the transparent glass preform in the longitudinal direction and the effect of suppressing the occurrence of burner clogging due to the deposition of the glass particles at the tip end of the burner are obtained by making the dispersion angle of the raw material gas jetted from the burner with respect to the center axis of the burner and the shortest distance from the tip end opening section of the raw material port of the burner to the tip end opening section of the combustion gas port of the burner appropriate.

This application is based on Japanese Patent Application (JP-2012-288336) filed on Dec. 28, 2012, the entire contents of which are hereby incorporated by reference. All the references herein cited are incorporated by reference as a whole.

DESCRIPTION OF REFERENCE NUMERALS AND SIGNS

1: production apparatus, 2: reaction vessel, 3: lifting-rotating device, 5: control section, 10: support rod, 11: starting rod, 21: raw material supply device, 22, 22a, 122a: burner, 23: liquid raw material, 24: raw material vessel, 25: pump, 26: supply pipe, 27: booth, 28: tape heater, 30: glass particles, 31a: raw material port, 31a1, 41a1: liquid raw material port, 32, 42: combustion gas port

The invention claimed is:

1. A glass particle deposit producing method including:
a deposition process for producing a glass particle deposit by mounting a starting rod and a glass particle generating burner inside a reaction vessel,
introducing a glass raw material into the burner,
subjecting the glass raw material to a flame decomposition reaction inside a flame formed by the burner to generate glass particles, and
depositing the generated glass particles on the starting rod, wherein a dispersion angle of the glass raw material jetted from the burner with respect to a center axis of the burner is set to a range of 20 to 70 degrees.

2. The glass particle deposit producing method of claim 1, wherein the dispersion angle is set to a range of 20 to 50 degrees in the deposition process.

3. The glass particle deposit producing method of claim 1, wherein the dispersion angle is set to a range of 20 to 40 degrees in the deposition process.

4. The glass particle deposit producing method of claim 1, wherein the shortest distance from the tip end opening section of the raw material port of the burner for jetting the glass raw material to the tip end opening section of the combustion gas port of the burner for jetting oxygen is set to a range of 10 to 100 mm in the deposition process.

5. The glass particle deposit producing method of claim 1, wherein the shortest distance from the tip end opening section of the raw material port of the burner for jetting the glass raw material to the tip end opening section of the combustion gas port of the burner for jetting oxygen is set to a range of 20 to 100 mm in the deposition process.

6. The glass particle deposit producing method of claim 1, wherein the shortest distance from the tip end opening section of the raw material port of the burner for jetting the glass raw material to the tip end opening section of the combustion gas port of the burner for jetting oxygen is set to a range of 30 to 100 mm in the deposition process.

7. The glass particle deposit producing method of claim 1, wherein the glass raw material to be supplied to the burner is siloxane in the deposition process.

8. The glass particle deposit producing method of claim 7, wherein the glass raw material to be supplied to the burner is octamethylcyclotetrasiloxane (OMCTS) in the deposition process.

9. The glass particle deposit producing method of claim 1, wherein the glass raw material to be jetted from the burner is set to a liquid spray state in the deposition process.

10. The glass particle deposit producing method of claim 1, wherein the glass raw material to be jetted from the burner is set to a gas state in the deposition process.

11. A glass preform producing method including:
a transparentization process for producing a glass particle deposit using the glass particle deposit producing method of claim 1 and for producing a transparent glass preform by heating the produced glass particle deposit.

12. The glass preform producing method of claim 11, wherein the deposition of the glass particle deposit in the deposition process is carried out by the OVD method, the VAD method or the MMD method.

* * * * *